Dec. 4, 1951  J. O. THORSHEIM  2,577,165
CONTROL DEVICE
Filed Dec. 16, 1948
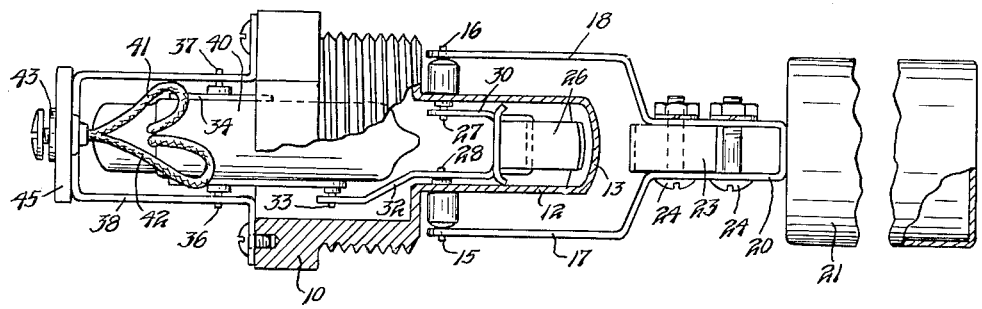
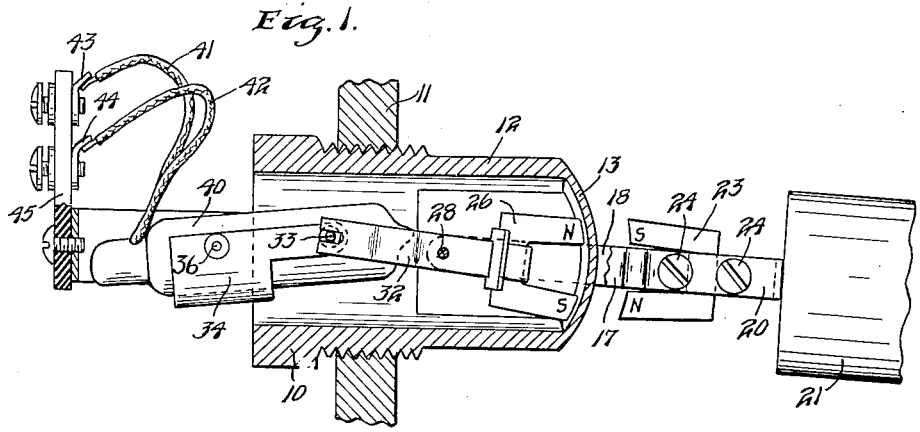
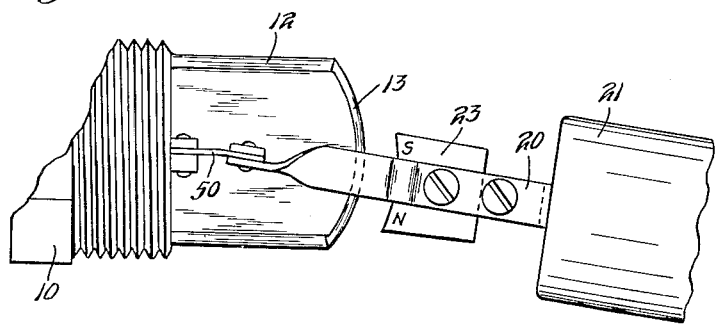
INVENTOR.
JOSEPH O. THORSHEIM
BY
George H. Fisher
ATTORNEY Patented Dec. 4, 1951

2,577,165

UNITED STATES PATENT OFFICE 2,577,165

CONTROL DEVICE

Joseph O. Thorsheim, Minneapolis, Minn., assignor to Minneapolis-Honeywell Regulator Company, Minneapolis, Minn., a corporation of Delaware Application December 16, 1948, Serial No. 65,703

5 Claims. (Cl. 200—84)

1

This invention relates to control mechanisms and more particularly to a device responding to the level of liquid in a pressure chamber.

An object of the invention is to provide a mechanism in which a pair of permanent magnets employed to transmit mechanical movement through a wall of a pressure chamber.

Another object of the invention is to provide a magnetic motion transmitting device in which the attraction between opposite poles of two magnets is aided by the repulsion between similar poles.

A further object is to provide a motion transmitting device in which two magnets on opposite sides of a fluid tight wall are coaxially pivoted.

A still further object is to provide a liquid level responsive switch incorporating the features outlined above.

Further objects will be apparent from the written description and appended claims and from the drawing, in which, Figure 1 is an elevation, partly in section of a liquid level controlled switch incorporating various features of my invention, Figure 2 is a plan view, partly in section of the device shown in Figure 1, and Figure 3 is a view of a modified float pivot arrangement.

In the float actuated switching device of Figures 1 and 2, a threaded plug 10 is adapted to be screwed into the wall 11 of a tank, boiler or the like at the level at which it is desired to maintain a body of liquid therein. This plug 10 serves as a support for the remaining portions of the device to be described hereinafter. Plug 10 is provided with an extension 12 which is adapted to extend into the tank or pressure chamber. This portion 12 is provided with a wall 13 which is of spherical configuration so that pressure existing within the pressure chamber will not cause appreciable deformation thereof. The wall 13 and preferably the portion 12 of the plug 10 is of some suitable nonmagnetic materials such as brass. Extending outwardly from the sides of the portion 12 are a pair of pivot pins 15 and 16 on which are pivoted the bifurcated portions 17 and 18 of a float arm 20. A float 21, which is preferably of a diameter less than the required opening through the pressure chamber in which the plug 10 is mounted, is carried at the end of the float arm 20.

U-shaped permanent magnet 23 is secured to the float arm 20 by a pair of screws 24. It will be noted that the north and south poles of magnet 23 are disposed equidistant from the axis of rota-

2 tion of float arm 20. Also it will be noted that both of the poles of this magnet lie in a plane normal to the axis of rotation and are arcuately spaced with respect to the axis of rotation.

Another U-shaped magnet 26 is disposed on the opposite side of the wall 13 and is pivoted on the portion 12 of the plug 10 on the same axis as the pivot for the float arm 20. Pins 27 and 28 extending inwardly from the portion 12 of the plug 10 act as pivots for a yoke 30 that carries the magnet 26. The poles of the magnet 26 are disposed in a plane normal to the pivotal axis with the pole faces lying rather close to the inside of the wall 13. Also the poles of the magnet 26 are adapted to rotate in the same plane in which the poles of the magnet 24 are situated. It will be noted that the north pole of the magnet 26 normally lies across the wall 13 from the south pole of the magnet 23 and that the south pole of the magnet 26 lies opposite the north pole of the magnet 23.

Movements of the magnet 23 as dictated by the position of the float 21 are transmitted to the magnet 26 by the attraction between the oppositely disposed dissimilar magnet poles of the two magnets. Also, the poles of each magnet are sufficiently close together so that when the magnets become angularly displaced to a slight extent similar poles of the magnets will be brought sufficiently close together so that the magnetic repulsion between these poles will have an additive effect on the amount of torque that may be transmitted therebetween. Tests have shown that with magnets disposed with their poles in a plane normal to the axis of rotation the amount of torque which may be transmitted therebetween is approximately 55 per cent greater than if the poles of both magnets are rotated 90° from the position shown to lie in a plane including the axis of rotation.

The rather considerable spacing between the poles of the magnet 23 and the wall 13 is provided to insure continued operation of the device even though a considerable amount of foreign matter such as boiler scale accumulates on wall 13.

The yoke 30 which carries the magnet 26 is provided with a rearwardly extending projection 32 which is pivotally moved on movement of the magnet 26. The end of the extension 32 is bifurcated to engage a pin 33 which extends from a mercury switch carriage 34. The carriage 34 is pivoted on a pair of pins 36 and 37 in a U-shaped bracket 38 which is suitably secured to the plug 10. The carriage 34 supports a mercury switch 40 having lead wires 41 and 42 connected to binding posts 43 and 44 on a terminal block 45, which is in turn carried by the bracket 38. While the mercury switch 40 has been shown as arranged in the mechanical linkage so that it will be actuated to closed position when the float 21 is lowered, it will be appreciated that the mercury switch could be reversed so that it would close when float 21 is in raised position.

If it is desired that the switch not follow minute changes in liquid level, a lost motion connection may be provided between the pin 33 on the mercury switch carriage 34 and the forked end of the projection 32 of the yoke 30. A friction mounting may be provided for the mercury switch 40 to maintain it in any of its adjusted positions.

Figure 3 shows an arrangement for pivotally mounting the float arm 20 on the plug 10 that would be somewhat less subject to failure due to accumulation of boiler scale. A flexible strip 50 has its left end secured to the plug 10 and its right hand end secured to one of the bifurcated portions of the float arm 20. It will be understood that a similar pivot arrangement is provided on the opposite side of the plug 10. The magnet 26 is pivoted interially of the plug 10 on a pivot approximating as closely as possible the pivotal axis provided by the flexible strip 50.

It will be appreciated that various modifications could be made to the device which has been described in detail, and that the scope of the invention is to be determined only by the appended claims.

I claim as my invention:

1. A device for transmitting mechanical movement comprising, in combination, a support including an impervious wall of nonmagnetic material, a U-shaped permanent magnet pivotally mounted on said support with the poles of said magnet spaced in a plane normal to said axis and with pole faces adjacent said wall, said wall being shaped so that both of the poles of said magnet remain at a constant distance therefrom during pivotal movement of said magnet, a second U-shaped permanent magnet disposed on the opposite side of said wall with pole faces adjacent said wall, and having a pole spacing similar to said first magnet, said second magnet being pivotally mounted on said support on the axis on which said first magnet is pivoted and with its poles reversed with respect to said first magnet, and spaced in a plane normal to the pivotal axis passing through the poles of said first magnet.

2. In a liquid level responsive switch, in combination, a supporting member including a wall of nonmagnetic material, a U-shaped permanent magnet pivotally mounted to rotate about an axis in said supporting member with the poles of said magnet spaced in a plane normal to said axis and with the pole faces adjacent said wall, said wall being shaped so that both of the poles of said magnet remain at a constant distance therefrom during pivotal movement of said magnet, a second U-shaped permanent magnet disposed on the opposite side of said wall with the pole faces adjacent said wall, and having its poles spaced the same distance as the poles of said first magnet, said second magnet being pivotally mounted in said supporting member on the axis on which said first magnet is pivoted and with its poles reversed with respect to said first magnet and spaced in a plane normal to the pivotal axis passing through the poles of said first magnet, a switch actuated by pivotal movement of said first magnet, and a float for pivotally positioning said second magnet.

3. A device for transmitting mechanical movement comprising, a support including an impervious wall, a first member pivotally mounted in said support on one side of said wall, a U-shaped permanent magnet carried by said member with the legs of the U extending outwardly from the pivotal axis, a second member pivotally mounted in said support on the other side of said wall on the same pivotal axis as said first member, and a second U-shaped permanent magnet carried by said second member with the legs of the U extending toward said pivotal axis, said magnets being disposed so that a plane normal to said pivotal axis passes through both poles of both of said magnets.

4. A liquid level responsive control device comprising, a support including an impervious wall, a first member pivotally mounted in said support on one side of said wall, a U-shaped permanent magnet carried by said member with the legs of the U extending outwardly from the pivotal axis, a second member pivotally mounted in said support on the other side of said wall on the same pivotal axis as said first member, a second U-shaped permanent magnet carried by said second member with the legs of the U extending toward said pivotal axis, said magnets being disposed so that a plane normal to said pivotal axis passes through both poles of both of said magnets, control means actuated by pivotal movement of said first member, and a float for causing pivotal movement of said second member.

5. In a device for transmitting mechanical movement, a supporting member, a first permanent magnet pivoted on said support and disposed relative to the axis of rotation so that both poles are movable in the same arcuate path, and a second permanent magnet pivoted separately from said first magnet on the same axis and disposed relative to the first magnet with the poles normally facing dissimilar poles of the other magnet, the angular spacing of the poles of each magnet with respect to the pivotal axis being less than a straight angle and further being such that on relative angular displacement the torque supplied by attraction between dissimilar poles of the two magnets is aided to a substantial degree by repulsion between one of the poles of one magnet and the like pole of the other magnet.

JOSEPH O. THORSHEIM.

REFERENCES CITED

The following references are of record in the file of this patent:

UNITED STATES PATENTS

| Number | Name | Date |
|---|---|---|
| 1,917,317 | Nacey | July 11, 1933 |
| 2,062,674 | Pirwitz | Dec. 1, 1936 |
| 2,204,161 | Shepherd | June 11, 1940 |
| 2,300,300 | Lund | Oct. 27, 1942 |
| 2,352,830 | Ford | July 4, 1944 |